US011095636B1

(12) United States Patent
Sokolov et al.

(10) Patent No.: US 11,095,636 B1
(45) Date of Patent: Aug. 17, 2021

(54) SYSTEMS AND METHODS FOR PROTECTING PASSWORDS

(71) Applicant: Symantec Corporation, Mountain View, CA (US)

(72) Inventors: Ilya Sokolov, Boston, MA (US); Keith Newstadt, Newton, MA (US)

(73) Assignee: NortonLifeLock Inc., Tempe, AZ (US)

( * ) Notice: Subject to any disclaimer, the term of this patent is extended or adjusted under 35 U.S.C. 154(b) by 242 days.

(21) Appl. No.: 16/139,490

(22) Filed: Sep. 24, 2018

(51) Int. Cl.
*H04L 29/06* (2006.01)
*H04L 9/32* (2006.01)
*H04L 29/08* (2006.01)

(52) U.S. Cl.
CPC .......... *H04L 63/083* (2013.01); *H04L 9/3226* (2013.01); *H04L 63/10* (2013.01); *H04L 63/1408* (2013.01); *H04L 63/306* (2013.01); *H04L 67/26* (2013.01)

(58) Field of Classification Search
CPC ............... H04L 63/083; H04L 63/0823; G06F 2221/2111; H04W 12/0608; H04W 12/0027
USPC .......................................................... 726/5
See application file for complete search history.

(56) References Cited

U.S. PATENT DOCUMENTS

2014/0298432 A1\* 10/2014 Brown ................ H04L 63/0853
726/6
2018/0083958 A1\* 3/2018 Avilov .................. H04L 63/083

\* cited by examiner

*Primary Examiner* — Evans Desrosiers
(74) *Attorney, Agent, or Firm* — FisherBroyles, LLP

(57) ABSTRACT

The disclosed computer-implemented method for protecting passwords may include (i) intercepting network traffic indicating an attempted login procedure at a workload device to login to a protected resource, (ii) prompting a user, in response to intercepting the network traffic, and at an authentication device that has been registered to the user, to indicate whether to approve the attempted login procedure, (iii) collecting, at the authentication device, a credential for the attempted login procedure that was stored in a protected vault of the authentication device, (iv) providing, by the authentication device to the workload device, an authentication decision based on the collected credential, and (v) injecting, at the workload device, the authentication decision into a browser session to enable the user to complete the attempted login procedure to login to the protected resource. Various other methods, systems, and computer-readable media are also disclosed.

20 Claims, 7 Drawing Sheets

SYSTEMS AND METHODS FOR PROTECTING PASSWORDS

BACKGROUND

People use many devices in their everyday lives. These devices may include home and office desktop computers, laptops, tablets, and Internet-of-things devices, etc. Some of these devices are trusted and personally owned. Some of these devices are public and vulnerable to security risks. Furthermore, some of these devices are owned by somebody else, such as in a scenario where one individual uses a friend's laptop. People access various services from these devices (e.g., email, social networks, video streaming, etc.) and authenticate themselves to the services, thereby exposing authentication credentials to these devices.

At the same time, password vaults are popular with users for storing various user authentication credentials. These vaults may have a capability for recognizing login forms and automatically injecting authentication credentials (e.g., usernames, passwords, second factor authentication codes, etc.) into authentication flows. These automated procedures are also known as "user auto login" procedures.

Unfortunately, the more devices are used, the higher the probability becomes that these authentication credentials will be exposed. It is desirable to limit the number of devices where credentials are exposed while also not artificially restricting the number of devices where the user can work. It is also often desirable to share a session with someone, such as a relative, without actually exposing authentication credentials. The instant disclosure, therefore, identifies and addresses a need for improved systems and methods for protecting passwords.

SUMMARY

As will be described in greater detail below, the instant disclosure describes various systems and methods for protecting passwords. In one example, a computer-implemented method for protecting passwords may include (i) intercepting network traffic indicating an attempted login procedure at a workload device to login to a protected resource, (ii) prompting a user, in response to intercepting the network traffic, and at an authentication device that has been registered to the user, to indicate whether to approve the attempted login procedure, (iii) collecting, at the authentication device, a credential for the attempted login procedure that was stored in a protected vault of the authentication device, (iv) providing, by the authentication device to the workload device, an authentication decision based on the collected credential, and (v) injecting, at the workload device, the authentication decision into a browser session to enable the user to complete the attempted login procedure to login to the protected resource.

In one embodiment, the protected resource may include a protected online resource. In one embodiment, the protected resource may include a user account of a protected online service. In one embodiment, the online service may include a social networking service and/or an email service.

In some examples, intercepting the network traffic may include (i) a local security agent at the workload device monitoring the network traffic, (ii) a local proxy agent at the workload device proxying the network traffic to a remote cloud-based security server, (iii) a smart device cover monitoring a visual display of the workload device, and/or (iv) a security agent at an intermediary network gateway monitoring network traffic. In some examples, prompting the user is performed according to a push notification protocol of at least one of an operating system or a third-party security vendor.

In one embodiment, the credential may include (i) a username, (ii) a password, and/or (iii) a second factor authentication code. In one embodiment, the authentication decision may include (i) a signed SECURITY ASSERTION MARKUP LANGUAGE assertion, (ii) an authorization code, and/or (iii) a token. In one embodiment, providing the authentication decision based on the collected credential includes redirecting a user session at the workload device to a captive portal and the captive portal collects the authentication decision from the authentication device. In one embodiment, the captive portal collects the authentication decision from the authentication device through (i) a QUICK RESPONSE code, (ii) a short range network communication, and/or (iii) a short range sound.

In some examples, redirecting the user session at the workload device to the captive portal is performed by a security agent at an intermediary network gateway monitoring network traffic. In some examples, redirecting the user session at the workload device to the captive portal is performed by the security agent at the intermediary network gateway monitoring network traffic without coordination by a local security agent at the workload device.

In one embodiment, the method is performed without exposing the credential to the workload device. In one embodiment, a result of prompting the user to indicate whether to approve the attempted login procedure is used to authenticate the user through an external identity provider. In one embodiment, the user is authenticated through the external identity provider without loading a page of the external identity provider into the browser session.

In one embodiment, a system for implementing the above-described method may include (i) an interception module, stored in memory, that intercepts network traffic indicating an attempted login procedure at a workload device to login to a protected resource, (ii) a prompting module, stored in memory, that prompts a user, in response to intercepting the network traffic, and as part of an authentication device that has been registered to the user, to indicate whether to approve the attempted login procedure, (iii) a collection module, stored in memory, that collects, as part of the authentication device, a credential for the attempted login procedure that was stored in a protected vault of the authentication device, (iv) a provisioning module, stored in memory, that provides, as part of the authentication device to the workload device, an authentication decision based on the collected credential, (v) an injection module, stored in memory, that injects, at the workload device, the authentication decision into a browser session to enable the user to complete the attempted login procedure to login to the protected resource, and (vi) at least one physical processor configured to execute the interception module, the prompting module, the collection module, the provisioning module, and the injection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept network traffic indicating an attempted login procedure at a workload device to login to a protected resource, (ii) prompt a user, in response to intercepting the network traffic, and at an authentication device that has been registered to the user, to indicate whether to approve the attempted login procedure, (iii) collect, at the authentication device, a credential for the attempted login procedure that was stored in a protected vault of the authentication device, (iv) provide, by the authentication device to the workload device, an authentication decision based on the collected credential, and (v) inject, at the workload device, the authentication decision into a browser session to enable the user to complete the attempted login procedure to login to the protected resource.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
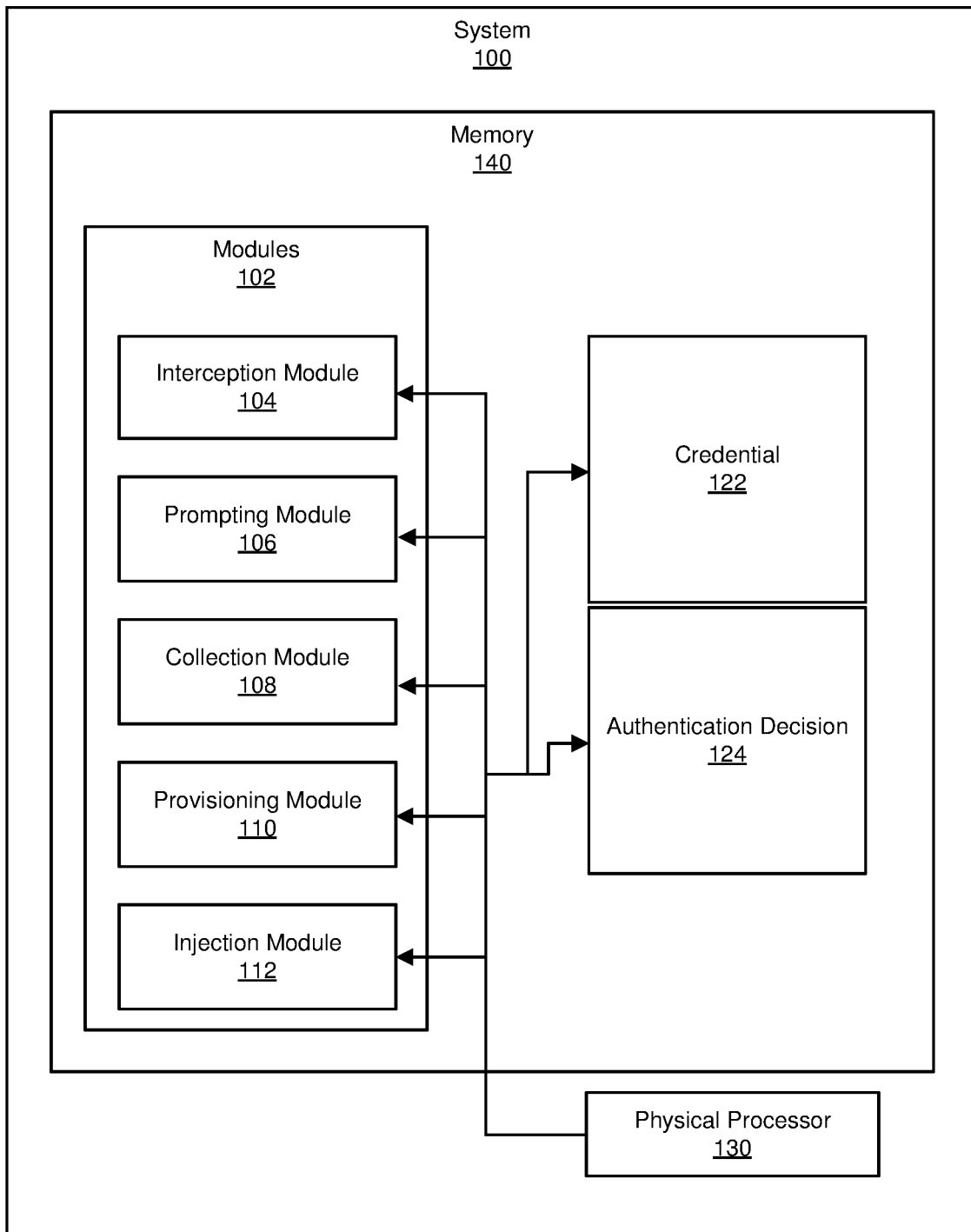
FIG. 1 is a block diagram of an example system for protecting passwords.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting passwords. As discussed in more detail below, the disclosed subject matter may improve upon related systems by helping to limit a number of devices to which an authentication credential is exposed. More specifically, the disclosed subject matter may enable a user at a workload device to login to a protected resource, such as a user account for an online service, through an automated communication procedure with an authentication device that has previously been registered with a security service. In these scenarios, the authentication device may authenticate the user, retrieve a credential from a password vault, use the credential from the password vault to obtain an authentication decision, and then forward the authentication decision to the workload device, without exposing the credential to the workload device. The workload device may then automatically use the authentication decision to complete the login procedure to the protected resource.

Figure 2:
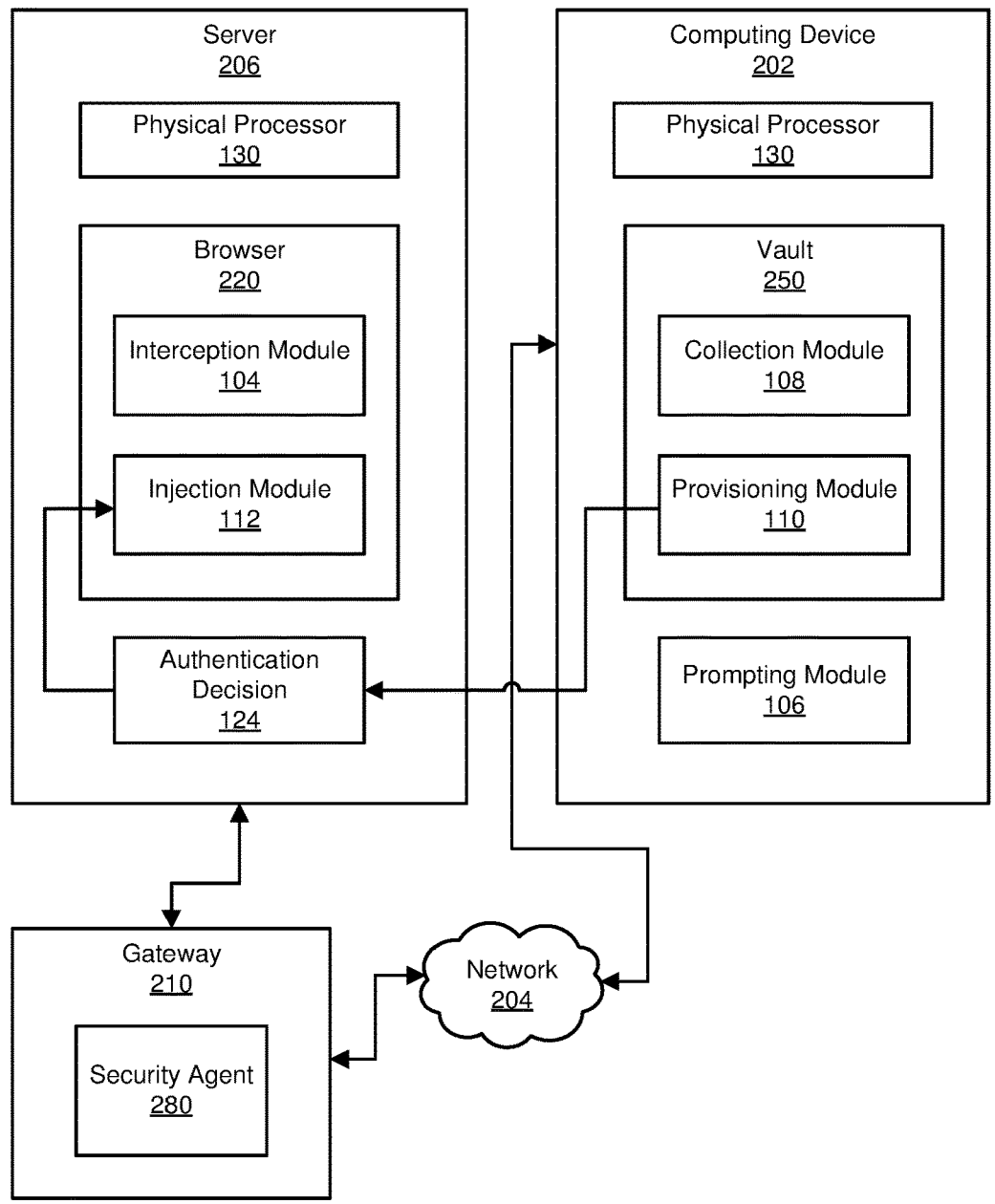
FIG. 2 is a block diagram of an additional example system for protecting passwords.

The following will provide, with reference to FIGS. 1-2, detailed descriptions of example systems for protecting passwords. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for protecting passwords. As illustrated in this figure, example system 100 may include one or more modules 102 for performing one or more tasks. For example, and as will be explained in greater detail below, example system 100 may include an interception module 104 that intercepts network traffic indicating an attempted login procedure at a workload device to login to a protected resource. Example system 100 may additionally include a prompting module 106 that prompts a user, in response to intercepting the network traffic, and at an authentication device that has been registered to the user, to indicate whether to approve the attempted login procedure. Example system 100 may also include a collection module 108 that collects, at the authentication device, a credential 122 for the attempted login procedure that was stored in a protected vault of the authentication device. Example system 100 may additionally include a provisioning module 110 that provides, as part of the authentication device to the workload device, an authentication decision 124 based on the collected credential. Example system 100 may also include an injection module 112 that injects, at the workload device, authentication decision 124 into a browser session to enable the user to complete the attempted login procedure to login to the protected resource. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting passwords. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect passwords.

For example, and as will be described in greater detail below, interception module 104 may intercept network traffic indicating an attempted login procedure at a workload device, such as server 206, to login to a protected resource. Prompting module 106 may prompt a user, in response to intercepting the network traffic, and at an authentication device, such as computing device 202, that has been registered to the user, to indicate whether to approve the attempted login procedure. Collection module 108 may collect, at computing device 202, credential 122 for the attempted login procedure that was stored in a protected vault, such as a vault 250, of computing device 202. Provisioning module 110 may provide, as part of computing device 202, and to server 206, authentication decision 124 based on collected credential 122. Injection module 112 may inject, at server 206, authentication decision 124 into a browser session of a browser 220 to enable the user to complete the attempted login procedure to login to the protected resource.

Computing device 202 generally represents any type or form of computing device capable of reading computer-executable instructions. In one illustrative example, computing device 202 may correspond to a user's personal laptop, tablet, smartwatch, or other personal device. Additional examples of computing device 202 include, without limitation desktops, servers, cellular phones, Personal Digital Assistants (PDAs), multimedia players, embedded systems, wearable devices (e.g., smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Server 206 generally represents any type or form of computing device that is capable of facilitating the performance of method 300, as discussed further below. Illustrative examples of server 206 include a home or enterprise desktop computer or workstation. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
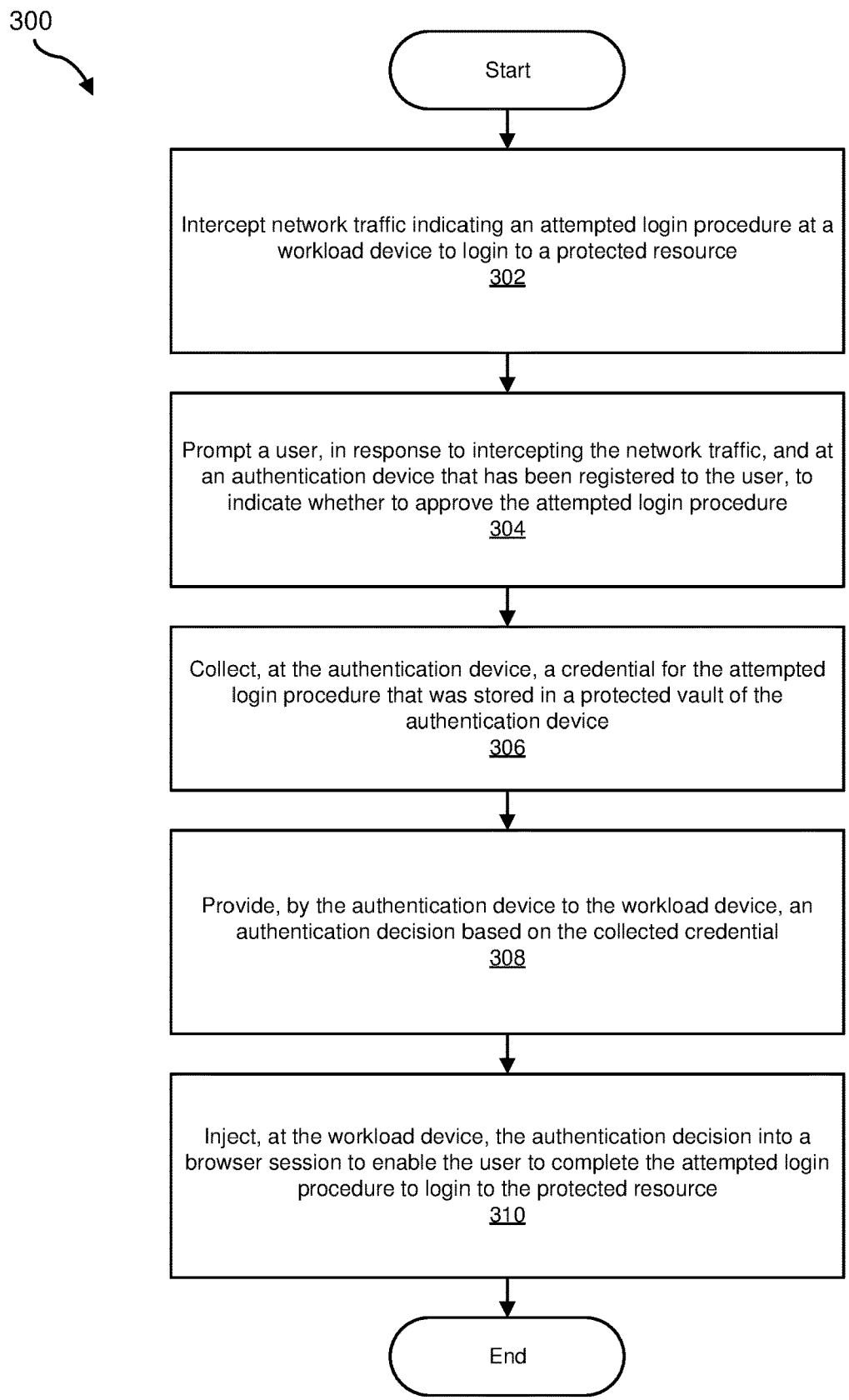
FIG. 3 is a flow diagram of an example method for protecting passwords.
Figure 4:
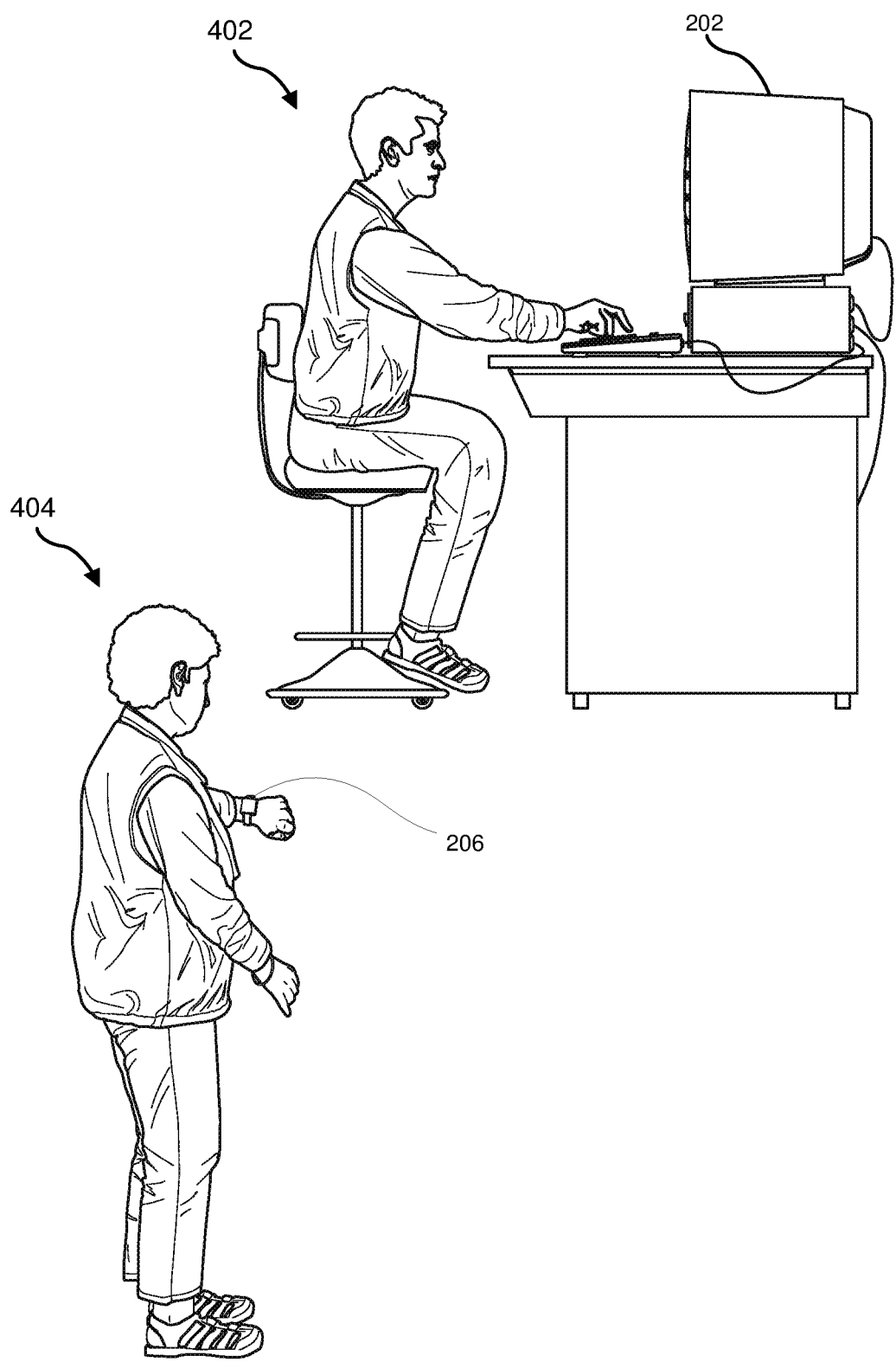
FIG. 4 is an illustration of an example workload device and also an example authentication device.

For purposes of illustration, FIG. 4 shows an example 402 of computing device 202, which may correspond to the authentication device, as discussed above in connection with FIG. 2. In this specific example, computing device 202 takes the form of a smartwatch that the user may wear on the user's wrist. Additionally, FIG. 4 also shows another example 404 of server 206, which may correspond to the workload device, as further discussed above in connection with FIG. 2. As further shown in FIG. 4, in this example server 206 may correspond to a standard home desktop computer that a user may use for either home or business purposes, as discussed further below in connection with method 300 of FIG. 3.

FIG. 3 is a flow diagram of an example computer-implemented method 300 for protecting passwords. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may intercept network traffic indicating an attempted login procedure at a workload device to login to a protected resource. For example, interception module 104 may, as part of server 206 in FIG. 2, intercept network traffic indicating an attempted login procedure at a workload device to login to a protected resource. As used herein, the term "workload device" generally refers to any client or customer computing device that a user may use in accordance with method 300, as discussed further below. Moreover, as used herein, the term "protected resource" generally refers to any resource that the user may access at the workload device and that is protected such that the user is requested to perform the login procedure in order to access the corresponding resource. Illustrative examples of protected resources may include user accounts, user data, cloud storage, physical computing devices, hardware devices, software components, network components, virtual components, and/or firmware components, etc.

Interception module 104 may intercept the network traffic indicating the attempted login procedure at the workload device to login to the protected resource in a variety of ways. In some examples, the protected resource may include a protected online resource. The online resource may correspond to any computing resource that is accessible via a network connection. For example, the protected resource may include a user account of an online service. Illustrative examples of the online service may include social networking services and/or email services. Additionally, or alternatively, the online service may include any other suitable online service, such as a cloud storage service, a cloud computing service, a multimedia or entertainment service, and/or a search engine service.

In some examples, interception module 104 may intercept the network traffic at least in part by interception module 104 acting as a local security agent at the workload device monitoring the network traffic. In the example of FIG. 2, interception module 104 may act as a local security agent at server 206. Additionally, or alternatively, in some examples, interception module 104 may intercept the network traffic at least in part by acting as a local proxy agent at the workload device proxying the network traffic to a remote cloud-based security server. In this example, rather than performing one or more security functions itself, interception module 104 may optionally simply forward one or more items of network traffic to the remote network server, and the remote network server may itself perform the security functions, such as one or more further steps of method 300, as discussed further below. Additionally, or alternatively, in some examples, interception module 104 may intercept the network traffic at least in part by acting as part of a smart device cover monitoring a visual display of the workload device. Returning to the example of FIG. 2, a web cam or other smart device cover may be placed adjacent to a display of the workload device to enable the smart device cover to monitor the display of the workload device. In this example, the smart device cover may check the monitored display of the workload device to detect one or more attempts to perform an authentication procedure in accordance with step 302 of method 300.

Additionally, or alternatively, in some examples, interception module 104 may intercept the network traffic at least in part by acting as a security agent at an intermediary network gateway that is monitoring network traffic. Returning to the example of FIG. 2, interception module 104 may in this example be disposed at a gateway 210 that serves as an intermediary network node between server 206 and network 204. More specifically, in this example interception module 104 may be disposed at gateway 210 in the form of a security agent 280. In other examples, interception module 104 may be disposed at server 206 and may also coordinate with, or communicate with, security agent 280 at gateway 210 to facilitate the performance of method 300, as discussed further below.

Returning to FIG. 3, at step 304, one or more of the systems described herein may prompt a user, in response to intercepting the network traffic, and at an authentication device that has been registered to the user, to indicate whether to approve the attempted login procedure. For example, prompting module 106 may, as part of computing device 202 in FIG. 2, prompt a user, such as the user shown in FIG. 4, in response to intercepting network traffic to indicate whether to approve the attempted login procedure.

Prompting module 106 may prompt the user to indicate whether to approve the attempted login procedure in a variety of ways. In some examples, prompting module 106 prompts the user using a push notification protocol of an operating system. For example, an operating system environment such as the ANDROID operating system environment and/or the iOS operating system environment may provide a system-wide push notification protocol for pushing messages, notifications, and/or authentication requests to users at endpoint computing devices, such as smart watches (e.g., the smart watch shown in FIG. 4) and smartphones. Additionally, or alternatively, prompting module 106 may prompt the user using a push notification protocol of a third-party security vendor, such as SYMANTEC. Accordingly, in these examples a third-party security vendor may provide one or more additional computer security components, such as endpoint software security products, to provide an additional layer of protection on endpoint computing devices, such as server 206 and/or computing device 202. These additional computer security components may establish their own push notification protocol, which may be analogous to the push notification protocol for one or more operating system environments, as discussed above. Accordingly, in these examples prompting module 106 may optionally leverage the push notification protocol provided by the third-party security vendor to push a request message to the user to indicate whether to approve the attempted login procedure.

Figure 5:
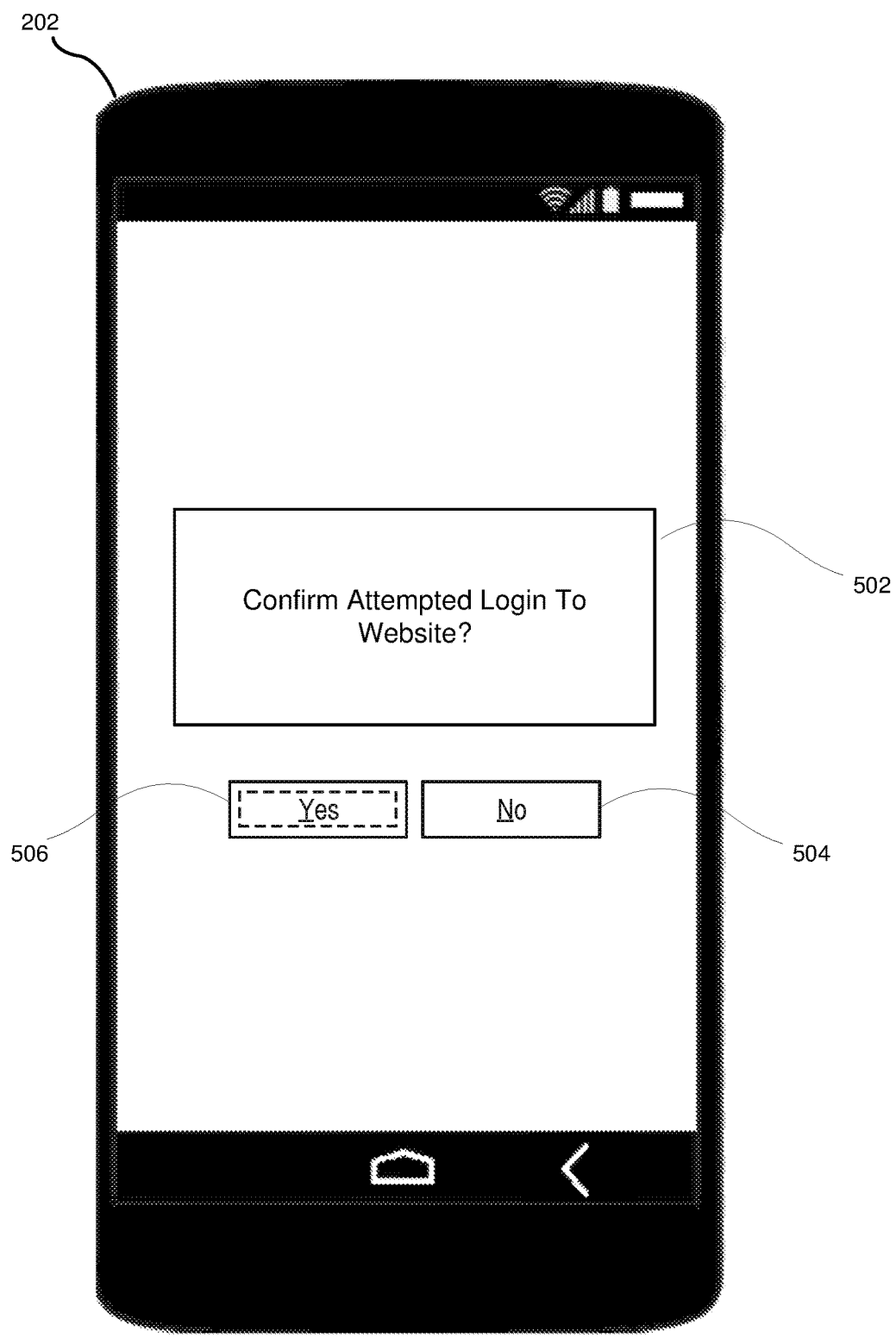
FIG. 5 is a block diagram of an example graphical user interface for protecting passwords.

FIG. 5 illustrates an example of computing device 202 when used in the performance of method 300 of FIG. 3. As further shown in this figure, computing device 202 may optionally include a graphical user interface. The graphical user interface may display a prompt message 502, which may specify the text "Confirm Attempted Login to a Website?" Additionally, the graphical user interface may also optionally include a button 506, which may enable the user to indicate an answer of "yes," and the graphical user interface may also optionally include a button 504, which may further enable the user to indicate an answer of "no." Accordingly, in these examples prompting module 106 may generate prompt message 502, which may prompt the user to toggle button 506 or button 504 to thereby indicate whether the user has concluded that the attempted login procedure should be approved or, alternatively, disapproved in accordance with method 300.

Although the example of FIG. 5 shows computing device 202, such as a smartphone device, including a graphical user interface, in alternative examples computing device 202 may only contain a minimalist interface for interacting with the user to receive the indication of whether the user approves the attempted login procedure. More specifically, in some examples computing device 202 may only be equipped with an input device that enables the user to input a binary decision of yes or no, thereby indicating whether to approve the attempted login procedure. Accordingly, in some examples computing device 202 may not even include a graphical user interface but may instead include a single button (e.g., a smart watch button), which may provide the interface through which the user provides the indication of whether the attempted login procedure is approved. Similarly, in some examples computing device 202 may simply signal to the user a request to input a decision of whether to approve the attempted login procedure using a minimalist audio output, such as a beep, rather than displaying the entirety of prompt message 502 that is further illustrated in FIG. 5 and that is discussed in more detail above.

In some examples, a result of prompting the user to indicate whether to approve the attempted login procedure may be used by prompting module 106 to optionally authenticate the user through an external identity provider. Some illustrative examples of identity providers may include SAML IDENTITY PROVIDER, OPENID CONNECT, HITACHI ID PASSWORD MANAGER, SECUREAUTH IDENTITY, PING IDENTITY, CIERGE, KEYCLOAK, AUTH0, GLUU, MINIORANGE, SYMANTEC SECURITY CLOUD IDENTITY PROVIDER, MICROSOFT AZURE ACTIVE DIRECTORY SYNC, OKTA, SYMANTEC VIP ACCESS MANAGER, and/or ORACLE IDCS. Moreover, in these examples prompting module 106 may optionally authenticate the user through the external identity provider without actually loading a page of the external identity provider into the browser session.

At step 306, one or more of the systems described herein may collect, at the authentication device, a credential for the attempted login procedure that was stored in a protected vault of the authentication device. For example, collection module 108 may, as part of computing device 202 in FIG. 2, collect credential 122 for the attempted login procedure that was stored in vault 250 of computing device 202. As used herein, the term "credential" generally refers to any item of information that a user may input as part of the attempted login procedure to successfully login to the protected resource, as further discussed above in connection with step 302 of method 300.

Collection module 108 may collect the credential from the vault in a variety of ways. In general, collection module 108 may successfully collect the credential from the vault in response to the user indicating an approval of the attempted login procedure to prompting module 106 at step 304, as discussed in more detail above. In some examples, collection module 108 may collect a credential from the vault by interacting with an application programming interface of the vault. For example, collection module 108 may optionally collect a credential from the vault by providing an authentication to the vault that the user indicated a decision at step 304 to approve the attempted login procedure. In these examples, the indication from the user to approve the attempted authentication procedure may optionally be signed using a private key that has previously been assigned to the user and/or a device registered to the user, such as computing device 202.

In some examples, collection module 108 may collect the credential at least in part by collecting one or more of a username, a password, and/or a second factor authentication code. Additionally, or alternatively, collection module 108 may optionally collect a challenge-response question and/or challenge-response answer, which may be used by the user to successfully complete the attempted authentication procedure. In general, collection module 108 may optionally collect any suitable item of information that may function as a credential for the user to successfully complete the attempted authentication procedure.

At step 308, one or more of the systems described herein may provide, by the authentication device to the workload device, an authentication decision based on the collected credential. For example, provisioning module 110 may, as part of computing device 202 in FIG. 2, provide to server 206 authentication decision 124 based on collected credential 122. As used herein, the term "authentication decision" generally refers to any item of information that indicates the result of a decision of whether the attempted authentication procedure should be successfully completed, such as approval or disapproval of the attempt by the user to authenticate himself or herself to access the protected resource.

Provisioning module 110 may provide the authentication decision in a variety of ways. In some examples, the authentication decision may include one or more of the following: a signed SECURITY ASSERTION MARKUP LANGUAGE assertion, an authorization code, and/or a token. Additionally, or alternatively, in other examples the authentication decision may optionally include any other item of information that may indicate a result of the attempted authentication procedure. In general, provisioning module 110 may optionally provide the authentication decision to the workload device, such as server 206, to thereby enable the user at the workload device to successfully complete the attempted authentication procedure. In some examples, provisioning module 110 may optionally provide the authentication decision to the workload device in a manner that is effectively transparent to the user. For example, in some scenarios provisioning module 110 may provide the authentication decision to the workload device, after the user successfully indicates approval of the attempted authentication procedure in response to prompting module performing step 304, without the user further performing any one or more steps to successfully complete the authentication procedure. In other words, in some examples the remainder of the attempted authentication procedure may proceed successfully to completion, autonomously and without further user intervention, after the user indicates approval of the attempted authentication procedure at step 304.

In some examples, provisioning module 110 may provide the authentication decision to the workload device at least in part by redirecting a user session at the workload device to a captive portal. In these examples, the captive portal may optionally correspond to a website, or any other network computing resource destination, that serves as the target of a redirection function that redirects a navigation by the user (e.g., a navigation by the user using the browser of step 310). In these examples, the redirection of the navigation by the user to the captive portal may be performed at least in part by a security agent at an intermediary network gateway monitoring network traffic, such as security agent 280 at gateway 210. Additionally, or alternatively, in these examples the security agent at the intermediary network gateway monitoring network traffic may optionally perform the redirection function without further coordinating with a local security agent at the workload device (e.g., the security function may be performed entirely at the gateway device and the corresponding or coordinating security agent at the workload device may be omitted in this embodiment).

Some illustrative examples of captive portals may include captive portal websites provided by hotels and/or airports to request that a guest user of a corresponding public network completes an authentication procedure in order to further access the public network. Additionally, or alternatively, in these examples, the captive portal may optionally collect the authentication decision from the authentication device. For example, the captive portal may optionally collect the authentication decision from the authentication device, such as computing device 202, through a QUICK RESPONSE code, a short range network communication, and/or a short range sound. More specifically, the captive portal may optionally collect the QUICK RESPONSE code by leveraging a camera or other optical scanner at server 206 that may visually detect the QUICK RESPONSE code, such as when this code is displayed visually by a display of computing device 202. Additionally, or alternatively, a short range network adapter, such as a near field communications network adapter, may detect the short range network communication that is transmitted by computing device 202, and/or a microphone at server 206 may detect the short range sound that is transmitted by one or more speakers of computing device 202. In one or more of these examples, the detected item of information may be configured to indicate the authentication decision, such as approval or disapproval of the attempted authentication procedure.

At step 310, one or more of the systems described herein may inject, at the workload device, the authentication decision into a browser session to enable the user to complete the attempted login procedure to login to the protected resource. For example, injection module 112 may, as part of server 206 in FIG. 2, inject authentication decision 124 into a browser session of browser 220 to enable the user to complete the attempted login procedure to login to the protected resource.

Injection module 112 may inject the authentication decision into the browser session to enable the user to complete the attempted login procedure in a variety of ways. In some examples, injection module 112 may inject the authentication decision into the browser session in a manner that is effectively transparent to the underlying user, as discussed further above in connection with step 308 of method 300. In these examples, injection module 112 may optionally complete the entire remainder of the attempted authentication procedure using the received authentication decision without requesting, or requiring, further manual intervention by the human user. Moreover, in these examples, injection module 112 may optionally complete the entire remainder of the attempted authentication procedure without further displaying one or more prompts for the user to input an item of information as part of the attempted authentication procedure. In general, injection module 112 may inject the authentication decision into the browser session such that the browser may transmit the authentication decision to a server or device that is performing the authentication procedure such that the server or device, such as an email or social networking server, may successfully complete the authentication procedure based on successful receipt of the authentication decision.

In these examples, injection module 112 may optionally perform step 310 without exposing the credential to the workload device. More generally, the entirety of method 300 may be performed without exposing the credential to the workload device. Accordingly, method 300 may successfully preserve the privacy of the credential by ensuring that the credential is exposed to the authentication device, as further discussed above, without further exposing the credential to one or more other devices, such as the workload device. The disclosed subject matter may thereby improve upon related systems that require or request the user to expose one or more credentials to additional devices in order to successfully complete the attempted authentication procedures on those additional devices.

As further discussed above, the disclosed subject matter may improve upon related systems by helping to limit a number of devices to which an authentication credential is exposed. More specifically, the disclosed subject matter may enable a user at a workload device to login to a protected resource, such as a user account for an online service, through an automated communication procedure with an authentication device that has previously been registered with a security service. In these scenarios, the authentication device may authenticate the user, retrieve a credential from a password vault, use the credential from the password vault to obtain an authentication decision, and then forward the authentication decision to the workload device, without exposing the credential to the workload device. The workload device may then automatically use the authentication decision to complete the login procedure to the protected resource.

Figure 6:
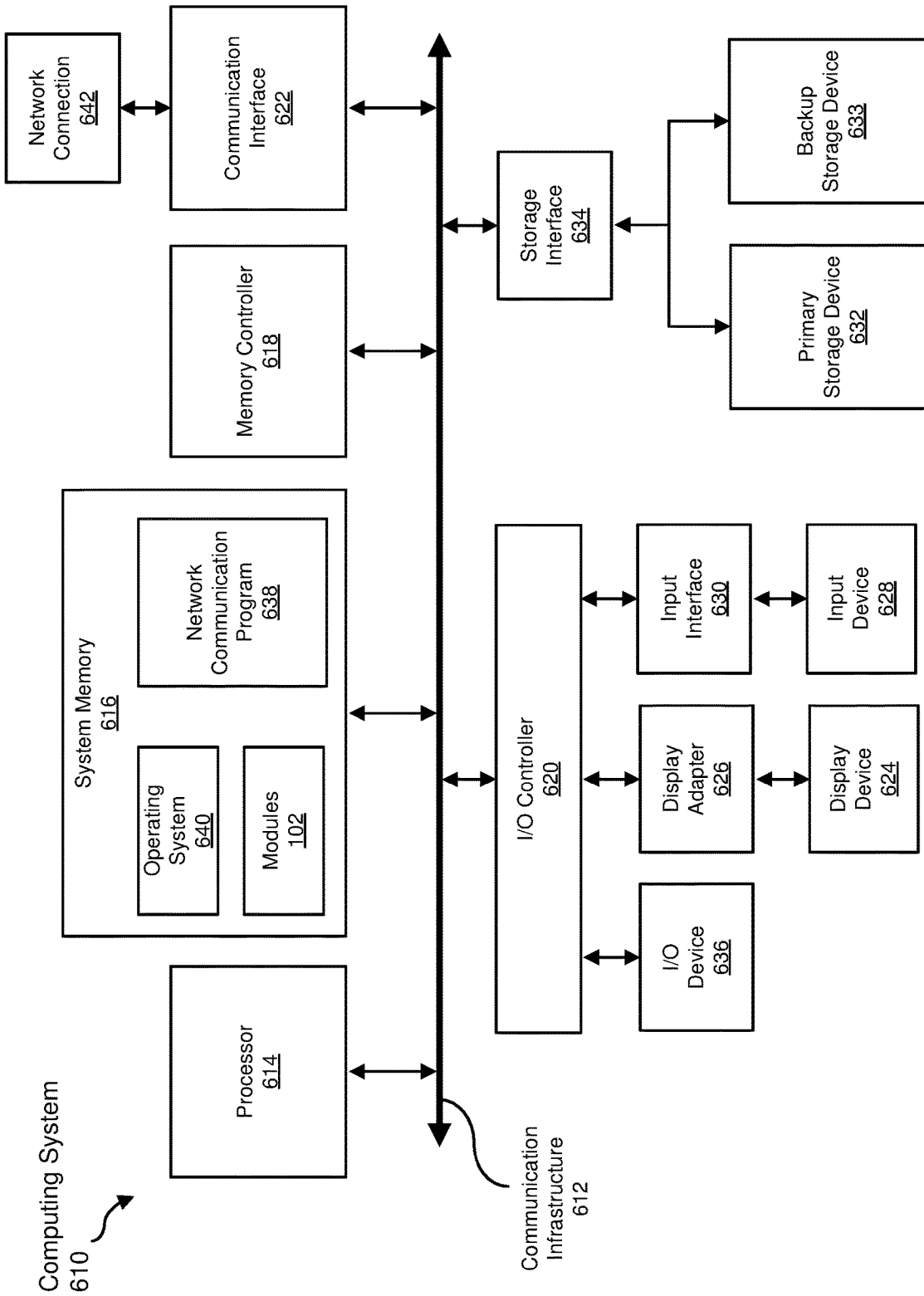
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
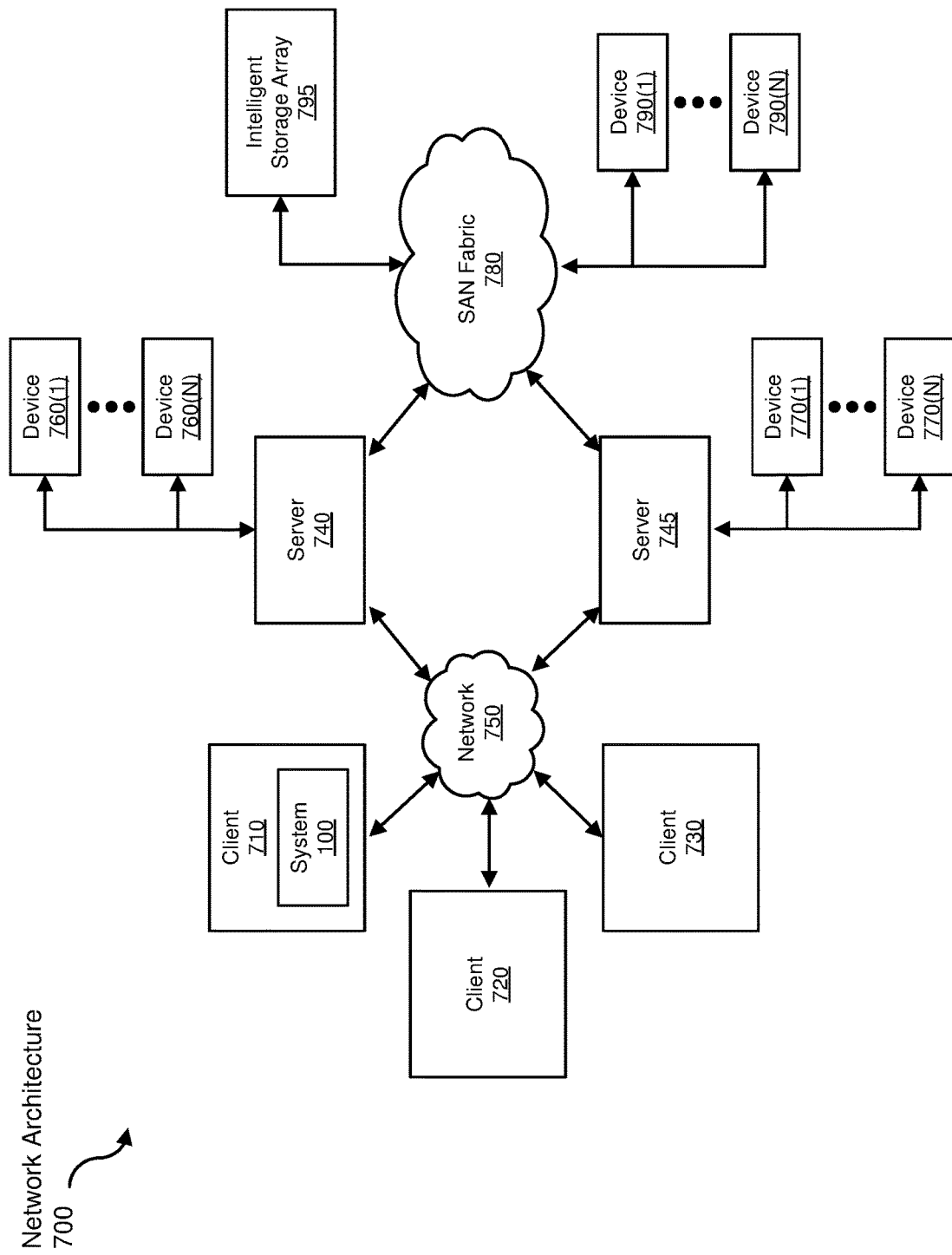
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting passwords.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting passwords, at least a portion of the method being performed by a computing device comprising at least one processor, the method comprising:
   intercepting network traffic indicating an attempted login procedure at a workload device to login to a protected resource;
   prompting a user, in response to intercepting the network traffic, and at an authentication device that has been registered to the user, to indicate whether to approve the attempted login procedure;
   collecting, at the authentication device, a credential for the attempted login procedure that was stored in a protected vault of the authentication device;
   providing, by the authentication device to the workload device, an authentication decision based on the collected credential; and
   injecting, at the workload device, the authentication decision into a browser session to enable the user to complete the attempted login procedure to login to the protected resource;
   wherein the workload device and the authentication device are both operated by the same user such that, in response to the user attempting the login procedure at the workload device, the user receives a push notification at the authentication device prompting the user to indicate whether to approve the attempted login procedure.

2. The computer-implemented method of claim 1, wherein the protected resource comprises a protected online resource.

3. The computer-implemented method of claim 2, wherein the protected resource comprises a user account of a protected online service.

4. The computer-implemented method of claim 3, wherein the online service comprises at least one of:
   a social networking service; or
   an email service.

5. The computer-implemented method of claim 1, wherein intercepting the network traffic comprises at least one of:
   a local security agent at the workload device monitoring the network traffic;
   a local proxy agent at the workload device proxying the network traffic to a remote cloud-based security server;
   a smart device cover monitoring a visual display of the workload device; or
   a security agent at an intermediary network gateway monitoring network traffic.

6. The computer-implemented method of claim 1, wherein prompting the user is performed according to a push notification protocol of at least one of an operating system or a third-party security vendor.

7. The computer-implemented method of claim 1, wherein the credential comprises at least one of:
   a username;
   a password; or
   a second factor authentication code.

8. The computer-implemented method of claim 1, wherein the authentication decision comprises
   a signed SECURITY ASSERTION MARKUP LANGUAGE assertion.

9. The computer-implemented method of claim 1, wherein:
   providing the authentication decision based on the collected credential comprises redirecting a user session at the workload device to a captive portal; and
   the captive portal collects the authentication decision from the authentication device.

10. The computer-implemented method of claim 9, wherein the captive portal collects the authentication decision from the authentication device through at least one of:
    a QUICK RESPONSE code;
    a short range network communication; or
    a short range sound.

11. The computer-implemented method of claim 9, wherein redirecting the user session at the workload device to the captive portal is performed by a security agent at an intermediary network gateway monitoring network traffic.

12. The computer-implemented method of claim 11, wherein redirecting the user session at the workload device to the captive portal is performed by the security agent at the intermediary network gateway monitoring network traffic without coordination by a local security agent at the workload device.

13. The computer-implemented method of claim 1, wherein the method is performed without sending the credential to the workload device.

14. The computer-implemented method of claim 1, wherein a result of prompting the user to indicate whether to approve the attempted login procedure is used to authenticate the user through an external identity provider.

15. The computer-implemented method of claim 14, wherein the user is authenticated through the external identity provider without loading a page of the external identity provider into the browser session.

16. A system for protecting passwords, the system comprising: an interception module, stored in memory, that intercepts network traffic indicating an attempted login procedure at a workload device to login to a protected resource;
    a prompting module, stored in memory, that prompts a user, in response to intercepting the network traffic, and as part of an authentication device that has been registered to the user, to indicate whether to approve the attempted login procedure;
    a collection module, stored in memory, that collects, as part of the authentication device, a credential for the attempted login procedure that was stored in a protected vault of the authentication device;

a provisioning module, stored in memory, that
provides, by the authentication device to the workload device, an authentication decision based on the collected credential; and
an injection module, stored in memory, that injects, at the workload device, the authentication decision into a browser session to enable the user to complete the attempted login procedure to login to the protected resource; and at least one physical processor configured to execute the interception module, the prompting module, the collection module, the provisioning module, and the injection module;
wherein the workload device and the authentication device are both operated by the same user such that, in response to the user attempting the login procedure at the workload device, the user receives a push notification at the authentication device prompting the user to indicate whether to approve the attempted login procedure.

17. The system of claim 16, wherein the protected resource comprises a protected online resource.

18. The system of claim 17, wherein the protected resource comprises a user account of a protected online service.

19. The system of claim 18, wherein the online service comprises at least one of:
a social networking service; or
an email service.

20. A non-transitory computer-readable medium comprising one or more computer-readable instructions that, when executed by at least one processor of a computing device, cause the computing device to:
intercept network traffic indicating an attempted login procedure at a workload device to login to a protected resource;
prompt a user, in response to intercepting the network traffic, and at an authentication device that has been registered to the user, to indicate whether to approve the attempted login procedure;
collect, at the authentication device, a credential for the attempted login procedure that was stored in a protected vault of the authentication device;
provide, by the authentication device to the workload device, an authentication decision based on the collected credential; and
inject, at the workload device, the authentication decision into a browser session to enable the user to complete the attempted login procedure to login to the protected resource;
wherein the workload device and the authentication device are both operated by the same user such that, in response to the user attempting the login procedure at the workload device, the user receives a push notification at the authentication device prompting the user to indicate whether to approve the attempted login procedure.

* * * * *